Mar. 13, 1923.
J. S. GRASSFIELD
TIRE TOOL
Filed Mar. 14, 1922
1,448,211
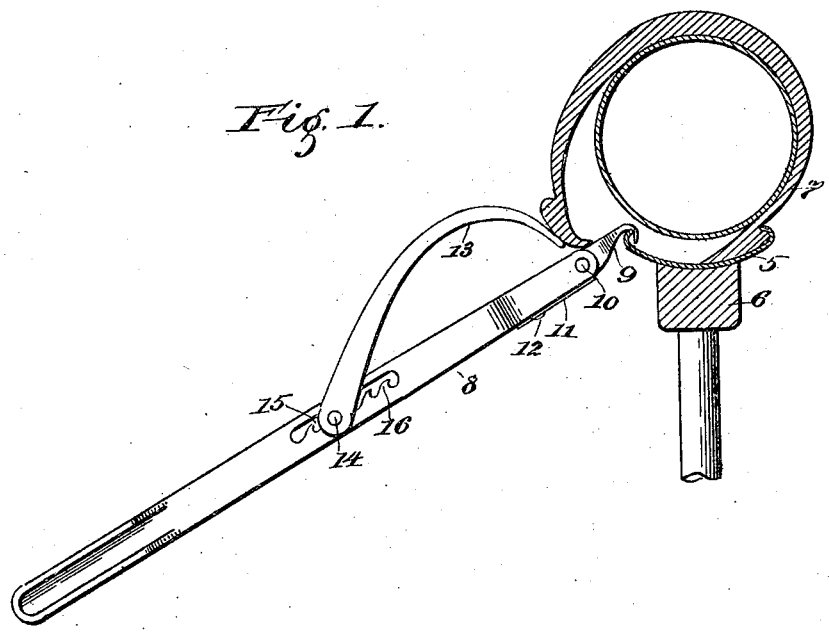
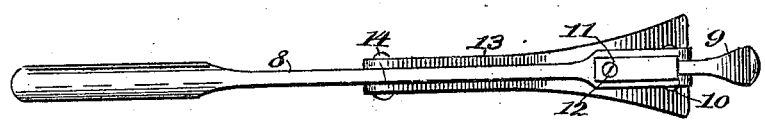
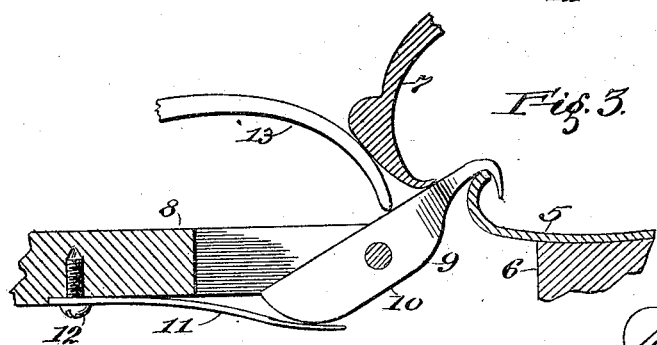
Inventor
John S. Grassfield
By J. M. St. John
Atty.

Patented Mar. 13, 1923.

1,448,211

UNITED STATES PATENT OFFICE.

JOHN S. GRASSFIELD, OF PARIS, IOWA.

TIRE TOOL.

Application filed March 14, 1922. Serial No. 543,768.

*To all whom it may concern:*

Be it known that I, JOHN S. GRASSFIELD, a citizen of the United States, residing at Paris, in the county of Linn and State of Iowa, have invented certain new and useful Improvements in Tire Tools; and I do hereby declare the following to be a full, clear, and exact description of the invention, such as will enable others skilled in the art to which it appertains, to make and use the same.

The object of this invention is to provide a simple, convenient and efficient tool for applying tires to clincher rims, whether the latter be attached to wheel fellies, or of the detachable type.

The invention is fully disclosed in the description and claims following, reference being had to the accompanying drawing, in which:—

Fig. 1 is a side elevation of a tool embodying my invention, and shown as in use. Fig. 2 is a plan view of the tool as seen from the under side. Fig. 3 shows enlarged details of the parts which connect with the wheel rim and engage the tire in the act of seating the tire in the rim, some of the parts being in section.

In the drawing, the numeral 5 denotes a clincher rim attached to a wheel felly 6. To the rim it is desired to apply the tire 7, and with the least trouble and labor. My improved tool for this purpose is described as follows:

At the forked inner end of a handle-bar 8 is pivotally mounted a hook 9 on a pin 10. The hook is made thin and comparatively wide, its thinness permitting its easy insertion between the tire and the clinch of the rim, when the tire is seated, or its detachment therefrom after seating the tire. Its width gives it sufficient strength to meet its requirements. Normally the hook extends straight out from the end of the hand-lever, as shown in Fig. 1, and is preferably held in such position by a spring 11 suitably attached to the hand-lever, as by a screw 12. The spring permits it to yield, however, as shown in Fig. 3, when the strain on the hook is such as to deflect it from the normal position.

To the hand-lever, some distance back from this hook, is pivotally connected a broad-nosed thrust-member 13, adapted to engage the bead of the tire substantially as shown. The simple, curved member, in the nature of a pawl, shown in the drawing, serves the purpose very effectively. Its forked end straddle the hand-lever, and a pin 14 serves as a pivot. It might be permanently attached at a definite point on the handle-bar, but its efficiency is much increased by providing for its adjustment thereon. This is done by slotting the bar at 15, and providing the slot with hooked teeth 16 to engage the pivot-pin 14.

In applying tires, one of the tools is effective, but a pair is better, stepping along the rim alternately. The hook being placed on the rim as shown, the operator pushes the thrust-member as far forward as the tire will conveniently allow, and by a lift of the lever forces the tire bead clear over the hook and into the clinching position. During this action the parts are inclined to take the positions shown in Fig. 3, but this does not at all retard the positioning action, since the thrust-member will slide up and over the hook, and deposit the bead in its seat. With one of the tools for each hand, the operator can easily place a tire that may be so new and stiff as to defy all attempts to apply it with ordinary tire tools.

It will be evident that the tool is used principally for putting on, rather than removing tires. It is useful for the latter purpose, however, since the hook may be forced between the bead and rim, and the thrust-member be then used to force the bead inwardly, when sticking tightly, as many do by reason of an extra tight fit, or from rust, or otherwise.

Having thus described my invention, I claim:

1. A tire-tool, comprising a hand-lever, a curved, broad-nosed thrust-member pivoted thereto, a rim-engaging hook pivoted at the end of the lever, and a spring to hold the hook in normal position.

2. A tire tool, comprising a hand-lever provided with a serrated slot, a thrust-member pivotally and adjustably engaging the teeth of the slot, and having a broad, thin, curved nose to engage the tire bead, and a thin, bead-engaging hook at the end of the lever, pivoted to yield under strain, and provided with a spring to hold it in normal position.

In testimony whereof I affix my signature in presence of two witnesses.

JOHN S. GRASSFIELD.

Witnesses:
 DONALD L. WOOD,
 STUART GRASSFIELD.